Oct. 27, 1964     D. L. JOHNSON     3,154,461
MATTE-FINISH POLYMERIC FILM AND METHOD OF FORMING THE SAME
Filed March 7, 1960

INVENTOR.
DOUGLAS L. JOHNSON
BY
Carpenter Abbott Coulter & Kinney
ATTORNEYS

United States Patent Office

3,154,461
Patented Oct. 27, 1964

3,154,461
MATTE-FINISH POLYMERIC FILM AND METHOD OF FORMING THE SAME
Douglas L. Johnson, West St. Paul, Minn., assignor to Minnesota Mining and Manufacturing Company, St. Paul, Minn., a corporation of Delaware
Filed Mar. 7, 1960, Ser. No. 13,165
13 Claims. (Cl. 161—116)

This invention relates to improvements in polymeric films and to the method of forming such film. This application is a continuation-in-part of my copending application Serial No. 800,446, filed March 19, 1959, now abandoned.

In the manufacture of polymeric film it is well known that subjection of the film to longitudinal and/or transverse tensile stress at a temperature somewhat above the second order transition temperature thereof effects stretching and molecular orientation of the polymeric material which imparts substantially increased strength and toughness thereto. Molecular orientation of this character ordinarily results in an increase in the density of the polymeric material as one or both of the major dimensions thereof increases, and the stretched polymeric film normally has a glossy finish, even though prior to stretching said film may have had a matte finish, for example as the result of an etching operation.

There is a substantial need for both clear and opaque films having a pencil or ink receptive matte or write-on finish. Heretofore opacity has been imparted to polymeric films by the application thereto of opaque coatings. Inclusion into film forming polymer of pigmenting materials of the general character and size used in the pigmenting of paint has been tried, but was not entirely satisfactory due to the expensive nature of pigments as well as to the difficulty of incorporation of effective amounts of such pigmenting materials into the polymer. When used in minor amounts, such pigmenting materials had an unsatisfactory opacifying effect on the extruded film. In order to provide a matte or write-on finish on films, resort has heretofore been had to expensive etching or abrading operations following orientation.

It is the general object of the present invention to provide polymeric having a matte finish, said films being characterized by dimensional stability, strength, toughness and water resistance.

Another object of the invention is to provide a method of making polymeric products of the aforementioned character.

Still another object of the invention is to provide an improved opaque polymeric product of the aforementioned character in which opacity is imparted thereto by a multiplicity of cellular voids dispersed therein and formed by subjection of said film to predetermined tensile stress.

Other and further objects and advantages of the invention will become apparent as the description proceeds, reference being had to the accompanying drawing which is for illustrative purposes only and is not necessarily to scale, and wherein like reference characters are employed to designate the same parts in all of the views.

In the practice of the present invention the polymeric body 3 shown in FIGURES 1 to 4 comprises a matrix polymer 5 which is preferably a high molecular weight transparent, thermoplastic, film and fiber forming, orientable, synthetic, linear polymeric material. Included among the synthetic polymers aforementioned are polyesters, polyamides, polyolefins and vinyl polymers. Dispersed within the matrix polymer 5 is a finely divided particulate material 6, which for certain applications preferably has the same index of refraction as the matrix polymer 5 and for other applications need not have this characteristic. The material 6 is also preferably chemically inert with respect to and insoluble in the matrix polymer 5 as well as in water. Experience has shown that satisfactory results are produced when the quantity of the particulate material used is within the range of from 1 to 25% by weight of the matrix polymer, though a larger percentage of certain materials may be employed within the inventive concept. A range of sizes of the particulate material which has been found to be satisfactory, and which is illustrative rather than limitative, is from approximately 0.3 micron to approximately 20 microns, the particular size utilized depending upon the material of the matrix polymer, the bond, if any, formed between the particulate material and the matrix polymer, the desired thickness of the finished product and other factors as will hereinafter appear.

The practice of the invention can perhaps best be described by reference to a typical illustrative example. Polyethylene terephthalate for use as the matrix polymer 5 may be made by charging a kettle with dimethyl terephthalate, ethylene glycol and suitable catalysts. The charge is heated in the kettle to convert the dimethyl ester to the bis(hydroxyethyl) terephthalate with the evolution of methanol. Upon further heating to 270 to 290° C. and the application of a vacuum to the kettle, the bis(hydroxyethyl) terephthalate is polymerized to polyethylene terephthalate with the evolution of ethylene glycol. The charge is continuously stirred under the noted conditions for about 6 hours, and the resultant homopolymer takes the form of a molten product of high viscosity, i.e., of the order of 2000 poises. A copolymer also suitable for use as the matrix polymer 5 may be made by the same process with the substitution of 10% by weight of dimethyl isophthalate for an equivalent amount of dimethyl terephthalate in the initial charge.

Figure 1:
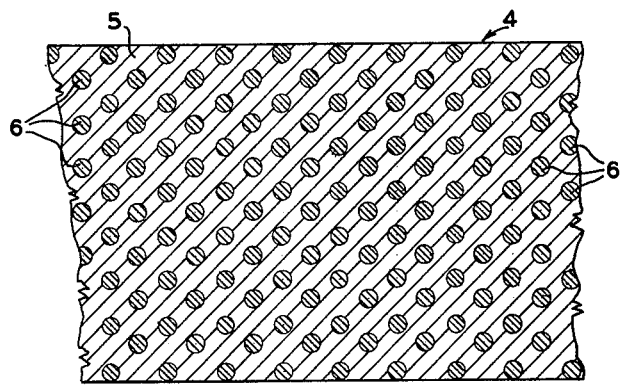
FIGURE 1 is an enlarged fragmentary longitudinal idealized cross sectional view of a polymeric film as extruded in the practice of the present invention and which has particulate material dispersed therein.
Figure 2:
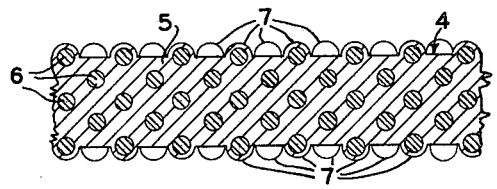
FIGURE 2 is a view similar to FIGURE 1 and showing the same polymeric body after orientation sufficient to impart a matte finish to the surface thereof.

The particulate material 6, which may take the form of calcium carbonate of substantially 1 to 5 micron particle size, is included in the initial charge in an amount constituting about 5% by weight of the molten polymer produced. The continual stirring of the batch during the polymerization process causes the particulate material to be thoroughly dispersed in the molten polymer produced, said polymer then being extruded into film form to provide a polymeric body 4 as shown in FIGURE 1. Since the calcium carbonate particles are substantially colorless and have substantially the same refractive index as the polymer 5, the polymeric body 4 produced therefrom is substantially transparent and has a smooth surface.

I have found that, contrary to the expected result, biaxially stretching or orienting the body 4 at a temperature somewhat above the second order transition temperature of the polymer 5, for example 180 to 190° F. when the polymer 5 is polyethylene terephthalate, and 1.3 to 2.5 times its initial longitudinal and transverse dimensions, instead of producing a glossy finish on said body, causes a roughening of the surface thereof producing a matte finish which renders a film receptive to marking by such instruments as a pencil, crayon, ball-point pen and the like. A matte finish of this type is shown on an enlarged scale in FIGURE 2, and is thought to be caused by the inward flow of the matrix polymer as the polymeric body is reduced in thickness upon stretching, so that the particles adjacent the surfaces of the body, being incompressible, form projections 7 without substantial surface rupture. In addition to the matte finish provided to the body 4 shown in FIGURE 2, said body retains its transparency, and is well adapted for use as a backing for adhesive mending tape, as drafting and tracing paper, and for many other purposes.

Figure 3:
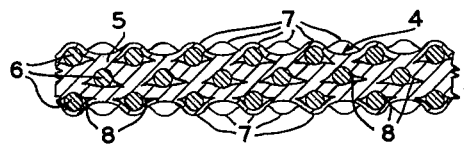
FIGURE 3 is a view similar to FIGURES 1 and 2 showing the same polymeric body after further orientation forming cellular voids rendering said film opaque and retaining the matte finish afforded by the initial orientation.

A further surprising and unexpected result was noted upon further uniaxial or biaxial stretching or orienting of the body 4 to 2.5 to 3.5 times its initial longitudinal and/or transverse dimension at the same temperature as before. Such additional stretching causes the appearance of the body to undergo a startling change, i.e. it is transformed from a colorless transparent body to a white opaque body, and the write-on or matte finish is retained. It is believed that this transformation results from the rupturing of any bond initially formed between the particulate material and the wall portions of the matrix polymer cells accommodating said particulate material and the pulling away of the cell wall portions from the individual particle accommodated therein and enlargement of the cell to include an opacifying void space having tapering peripheral portions. FIGURE 3 illustrates an opaque body having opacifying void spaces 8 surrounding the particles 6 and shaped as described.

For a given polymer 5 the stretch ratio required to produce a matte finish in the body 4, as well as the stretch ratio required to produce opacity therein, is temperature dependent. At higher temperatures than those indicated, higher stretch ratios are required to produce the desired effects.

The resultant opaque film 4 is paper thin and is characterized by dimensional stability, strength, toughness and water resistance far superior to paper. These characteristics, together with the intense opacity of the resultant film makes the latter useful in a wide variety of applications, including decorative wrappings and tapes, especially where a write-on finish is advantageous, and particularly for certain applications requiring a paper-like product which is stable under conditions ordinarily deleteriously affecting paper. Moreover, the characteristic whereby the transparent form of the body 4 of the present invention is transformed to the opaque form upon subjection to predetermined tensile stress renders said transparent body useful as a tensile stress sensing and indicating means in any apparatus in which sensing and indication of the absence or occurrence of a predetermined stress is desired. In such apparatus a film of the present invention may be subjected to the tensile stress to be monitored through suitable mechanism (not shown) which upon occurrence of a critical stress value, imparts the predetermined opacifying tensile stress to the transparent sensing and indicating film.

While the particulate material may be incorporated into the polymer by including it as part of the initial charge into the kettle so that the polymer is prepared in the presence thereof as aforedescribed, the particulate material may alternatively be incorporated into the polymer after the polymerization process has been completed, for example by extrusion milling said material into the preformed polymer.

Where a polymeric product having a write-on or matte finish is desired, but transparency is unimportant, the particles 6 need not have the same index of refraction as the matrix polymer 5. It is important, however, that in applications requiring an opaque product, any bond between the particle surfaces and the adjacent wall portions of the matrix polymer cells be rupturable within the stretch value desired or the stretch limit of the polymeric material. Thus, a body 4 which is to undergo higher tensilizing stresses permits the use of particulate material having a higher bond rupture value with respect to the matrix polymer. Conversely, when the body 4 is to be subjected to lower tensilizing stresses only, a particulate material having a lower bond rupture value with respect to the matrix polymer must be selected in order to produce the desired opacifying effect.

Stretching of polymeric films is ordinarily accompanied by an increase in the density thereof. In the stretching of the body 4 in the practice of the present invention, the density increases in the expected manner until the bond between the particles and the matrix polymer begins to rupture and form the opacifying voids 8 shown in FIGURE 3. At this point, due to the formation of the voids 8 and the increase in the size thereof in accordance with the amount of further stretching, the density of the body 4 begins to decrease, and such decrease continues with further stretching.

Where the particles 6 in the opaque body 4 shown in FIGURE 3 are transparent, said body may be returned to transparent condition by the application thereto of high compressive stresses which tend to collapse the voids 8 and cause the matrix polymer to re-engage the entire surface area of each particle. Large areas of a film, for example, may thus be transparentized, or limited areas may be transparentized as by the use of a stylus which applies such pressure over a point contact area at any given time. Thus, when an opaque film according to the present invention is written on with a stylus, the script appears as a transparent line area, rather than as an opaque area. If the body 4 is not heat set following tensilizing, subjection thereof to elevated temperatures substantially above the second order transition temperature of the polymer 5 and somewhat less than the melting point thereof causes said body to tend to return to its unstressed state substantially as shown in FIGURE 1 with simultaneous longitudinal and transverse shrinkage as well as thickening of the body, together with elimination of the opacifying void cells 8 and return of the body to its initial transparent condition. Where the body 4 is suitably restrained, it may be returned to any desired dimensions intermediate those of the opaque body and its initial dimensions.

The characteristic whereby the opaque body of the present invention tends to return to its original transparent condition and its original dimensions upon subjection to predetermined temperatures also renders the products of the present invention useful as a temperature sensing and indicating means. Not only does a film give a visible indication of the predetermined temperature in terms of changing from opaque to transparent, but it also simultaneously shrinks a substantial amount in the direction in which it was previously stretched. Either of these two responses to the predetermined critical temperature may be taken advantage of in temperature sensing or thermostatically controlled devices.

In the practice of the present invention a number of polymeric materials have been found to have the characteristics required of the matrix polymer 5. In addition to the polyesters polyethylene terephthalate and the copolymer thereof mentioned hereinbefore, other polymers which have been found to be satisfactory for use as the matrix polymer 5 are the polyamide polycaprolactam (nylon-6), the polyolefin polypropylene, and the vinyl polymer polyvinyl chloride. Materials which have been found to be satisfactory for use as the particular material 6, in addition to calcium carbonate mentioned hereinbefore, are mica, silica, calcium silicate, glass, clay, and titanium dioxide. Obviously other polymers suitable for the polymer 5 and other materials suitable for the particles 6 will suggest themselves. Each of the mentioned polymers, when one of the last-mentioned materials is dispersed therein in particulate form, affords a product having a matte or write-on finish when moderately stretched, said product being rendered opaque upon further stretching.

As aforeindicated, where the particulate material 6 is transparent, the body 4 is transparent when moderately stretched. The degree of stretch required to obtain intense opacity varies with the strength of the bond formed between the particles 6 and the matrix polymer 5, and this is somewhat dependent upon the size of the particles as is also the amount of the particulate material used. The amount and size of a given particulate material 6 which is best for use in a given polymer 5, can be readily determined by those skilled in the art.

Stretching of polymeric film in the practice of the present invention is preferably carried out at temperatures above the second order transition temperature and below the temperature range at which the matrix polymer softens and melts in order to insure uniform stretching of the polymer which is difficult if not impossible to achieve at temperatures below the indicated range. The method of the invention can readily be carried out by the use of conventional tensilizing equipment and consistently produces a uniform product.

Various changes and modifications may be made to meet the requirements of practice without departing from the spirit of the invention, and all of such changes are contemplated as may come within the scope of the appended claims.

What is claimed as the invention is:

1. The method of making a polymeric film having a matte finish comprising forming a film of a high molecular weight thermoplastic orientable linear polymer having dispersed therein substantially incompressible particles of 0.3–20 microns in diameter and in an amount within the range of 1–25% by weight of said polymer, which particles are substantially chemically inert with respect to said polymer, and then biaxially stretching said film to cause inward flow of said polymer between particles adjacent to the surface to form projections without substantial surface rupture, thereby providing a matte finish.

2. The method of making a substantially transparent polymeric film having a matte finish comprising forming a composition of a substantially transparent high molecular weight thermoplastic orientable linear polymer having dispersed therein incompressible particles of 0.3–20 microns in diameter and in an amount within the range of 1–25% by weight of said polymer, which particles have substantially the same index of refraction as said polymer and are substantially chemically inert with respect to said polymer, forming said composition into a film, and then biaxially stretching said film to about 1.3 to 2.5 times its original dimensions to cause inward flow of said polymer between particles adjacent to the surface to form projections without substantial surface rupture, thereby providing a matte finish.

3. The method of making a polymeric film having a matte finish comprising forming a composition of a high molecular weight thermoplastic orientable linear polymer having dispersed therein substantially incompressible particles of 0.3–20 microns in diameter and in an amount within the range of 1–25% by weight of said polymer, which particles are substantially chemically inert with respect to said polymer, forming said composition into a film, then heating said film to a temperature above the second order transition temperature of said polymer and below the temperature range at which said polymer softens and melts, and biaxially stretching said film to about 1.3 to 3.5 times its original dimensions while it is heated to said temperature to cause inward flow of said polymer between particles adjacent to the surface to form projections without substantial surface rupture, thereby providing a matte finish.

4. The method of forming an opaque polymeric film having a matte finish comprising forming a composition of a high molecular weight thermoplastic orientable linear polymer having dispersed therein incompressible particles of 0.3–20 microns in diameter and in an amount within the range of 1–25% by weight of said polymer, which particles are chemically inert with respect to said polymer, forming said composition into a film, then heating said film to a temperature above the second order transition temperature of said polymer and below the temperature range at which said polymer softens and melts, and stretching said film biaxially to about 2.5 to 3.5 times its original dimensions while it is heated to said temperature to cause inward flow of said polymer between particles adjacent to the surface to form projections without substantial surface rupture and to cause the polymer to pull away from individual particles to create opacifying void spaces.

5. The method of making a polymeric film having a matte finish comprising forming a composition of polyethylene terephthalate polymer having dispersed therein substantially incompressible particles of about 1–5 microns in diameter and in an amount within the range of 1–25% by weight of said polymer, which particles are substantially chemically inert with respect to said polymer, forming said composition into a film, then heating said film to a temperature above the second order transition temperature of said polymer and below the temperature range at which said polymer softens and melts, and biaxially stretching said film to at least 1.3 times its original dimensions while it is heated to said temperature to cause inward flow of said polymer between particles adjacent to the surface to form projections without substantial surface rupture, thereby providing a matte finish.

6. The method of making a polymeric film having a matte finish comprising forming a composition of a substantially transparent high molecular weight thermoplastic orientable and heat-shrinkable linear polymer having dispersed therein incompressible particles of 0.3–20 microns in diameter and in an amount within the range of 1–25% by weight of said polymer, which particles have substantially the same index of refraction as said polymer and are substantially chemically inert with respect to said polymer, forming said composition into a film, then biaxially stretching said film to about 2.5 to 3.5 times its original dimensions to cause inward flow of said polymer between particles adjacent to the surface to form projections without substantial surface rupture and to cause the polymer to pull away from individual particles to create opacifying void spaces, and then exposing said film to a predetermined temperature to effect shrinkage of the polymer and transparentization in the exposed areas.

7. As a new article of manufacture, a matte-finish film of high molecular weight thermoplastic biaxially-oriented linear polymer having dispersed therein substantially incompressible particles of 0.3–20 microns in diameter and in an amount within the range of 1–25% by weight of said polymer, which particles are substantially chemically inert with respect to the polymer, said oriented polymer receding inwardly between particles adjacent to the surface of the film to afford projections without substantial surface rupture.

8. As a new article of manufacture, a matte-finish film of high molecular weight thermoplastic biaxially-oriented linear polymer having dispersed therein incompressible particles of about 1–5 microns in diameter and in an amount within the range of 1–25% by weight of said polymer, which particles are chemically inert with respect to the polymer, said oriented polymer receding inwardly between particles adjacent to the surface of the film to afford projections without substantial surface rupture.

9. As a new article of manufacture, a substantially transparent void-free matte-finish film of high molecular weight thermoplastic biaxially-oriented linear polymer having dispersed therein incompressible particles of 0.3–20 microns in diameter and in an amount within the range of 1–25% by weight of said polymer, which particles have substantially the same index of refraction as said polymer and are substantially chemically inert with respect to the polymer, said oriented polymer receding inwardly between particles adjacent to the surface of the film to afford projections without substantial surface rupture.

10. As a new article of manufacture, a substantially opaque matte-finish film comprising a cellular matrix of high molecular weight thermoplastic biaxially-oriented linear polymer in which each of the cells accommodates a substantially incompressible particle of 0.3–20 microns in diameter and of substantially smaller volume than said cell such that each cell comprises substantial void space, the amount of said particles lying within the range of 1–25% by weight of said polymer, said particles being substantially chemically inert with respect to the polymer, said oriented polymer receding inwardly between particles adjacent to the surface of the film to afford projections without substantial surface rupture.

11. As a new article of manufacture, a substantially opaque matte-finish film comprising a cellular matrix of high molecular weight thermoplastic biaxially-oriented linear polymer in which each of the cells accommodates a substantially incompressible particle of about 1–5 microns in diameter and of substantially smaller volume than said cell such that associated with each particle is an opacifying void space having tapering peripheral portions, said particles being substantailly chemically inert with respect to said polymer and being present in an amount within the range of 1–25% by weight of the polymer, said oriented polymer receding inwardly between particles adjacent to the surface of the film to afford projections without substantial surface rupture.

12. As a new article of manufacture, a substantially opaque heat-shrinkable matte-finish film comprising a cellular matrix of high molecular weight thermoplastic biaxially-oriented linear polymer in which each of the cells accommodates a substantially incompressible particle of about 1–5 microns in diameter and of substantially smaller volume than said cell such that each cell comprises substantial void space, said particles being substantially chemically inert with respect to said polymer and being present in an amount within the range of 1–25% by weight of the polymer, said oriented polymer receding inwardly between particles adjacent to the surface of the film to afford projections without substantial surface rupture, exposure of said film to a predetermined temperature effecting shrinkage thereof, elimination of said voids and transparentization of said film.

13. As a new article of manufacture, biaxially-oriented polyethylene terephthalate film having dispersed therein substantially incompressible particles of about 1–5 microns in diameter and in an amount within the range of 1–25% by weight of said polymer, which particles are substantially chemically inert with respect to the polymer, said oriented polymer receding inwardly between particles adjacent to the surface of the film to afford projections without substantial surface rupture.

References Cited in the file of this patent

UNITED STATES PATENTS

| | | |
|---|---|---|
| 1,558,153 | Ferkel | Oct. 30, 1925 |
| 2,014,688 | Mabboux | Sept. 17, 1935 |
| 2,246,087 | Bailey | June 17, 1941 |
| 2,311,613 | Slayter | Feb. 16, 1943 |
| 2,352,725 | Markwood | July 4, 1944 |
| 2,445,555 | Binda | July 20, 1948 |
| 2,719,100 | Banigan | Sept. 27, 1955 |
| 2,948,583 | Adams | Aug. 9, 1960 |
| 3,022,541 | Passley | Feb. 27, 1962 |

FOREIGN PATENTS

| | | |
|---|---|---|
| 1,149,012 | France | July 1, 1957 |
| 610,137 | Great Britain | Oct. 12, 1948 |
| 784,920 | Great Britain | Oct. 16, 1957 |
| 217,890 | Australia | Nov. 28, 1957 |